E. G. LATTA.
TRACE BUCKLES.

No. 183,688. Patented Oct. 24, 1876.

UNITED STATES PATENT OFFICE.

EMMIT G. LATTA, OF FRIENDSHIP, ASSIGNOR TO BYRON C. SMITH, OF AUBURN, NEW YORK.

IMPROVEMENT IN TRACE-BUCKLES.

Specification forming part of Letters Patent No. 183,688, dated October 24, 1876; application filed September 7, 1876.

*To all whom it may concern:*

Be it known that I, EMMIT G. LATTA, of Friendship, in the county of Allegany and State of New York, have invented certain new and useful Improvements in Trace-Buckles, which improvements are fully set forth in the following specification, reference being had to the accompanying drawing.

This invention relates to that class of trace-buckles in which the tongue is formed on the under side of a plate connected to the buckle-frame by a bail passing through a loop on the tongue-plate.

The object of my invention is to adapt the buckle to hold traces of different thicknesses, and to connect the bail and tongue-plate to the buckle-frame permanently in a simple and effective manner, so as to prevent the accidental detachment of the parts.

The nature of my invention will be fully understood from the following description.

Figure 1:
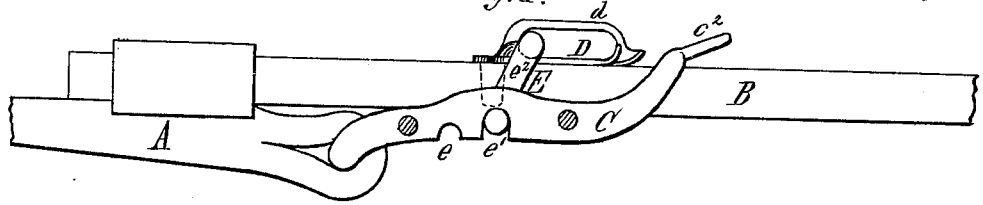
Figure 2:
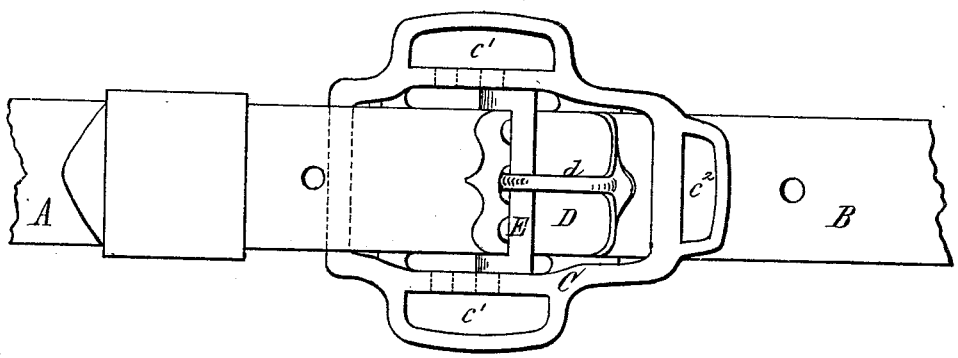
Figure 3:
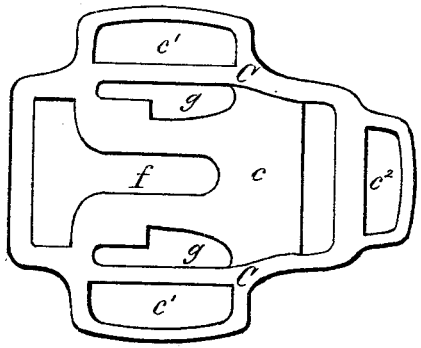
Figure 4:
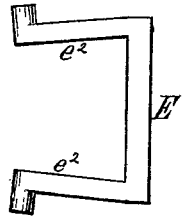

In the accompanying drawing, Figure 1 is a side elevation of a buckle provided with my improvements. Fig. 2 is a plan view thereof. Fig. 3 is a detached plan view of the buckle-frame. Fig. 4 is a detached view of the bail before it is secured to the buckle-frame.

Like letters of reference refer to like parts in each of the figures.

A represents the hame-tug, and B the trace. C represents the buckle-frame, constructed with a bed or plate, $c$, connecting the side bars, and forming a bearing or support for the trace, and provided with the usual side loops $c^1 c^1$ and rear loop $c^2$. D is the tongue-plate, provided with a raised loop, $d$, through which passes the cross-bar of the bail E. The side bars of the buckle-frame C are each provided on their under side with two or more recesses or notches, $e$ $e^1$, of different depths, for the reception of the pivot-pins of the bail E. By changing the pivots of the bail from the shallow recesses $e$ to the deeper recesses $e^1$, or vice versa, the buckle is adapted to receive and hold a trace of greater or less thickness between the plate $c$ of the buckle-frame and the tongue-plate D, as may be desired. The plate $c$ of the buckle-frame is provided with a central opening or slot, $f$, arranged underneath the tongue, and two side openings, $g$ $g$, arranged adjacent to the side bars of the buckle-frame, as clearly shown in Fig. 3.

The bail E is cast with its side bars $e^2$ drawn inwardly or contracted, as clearly shown in Fig. 4, so as to permit the same to be pressed down between the side bars of the buckle-frame C through the openings $g$ $g$, the rear portions of which are made sufficiently wide to allow the pivots of the bail E to pass through, while the front portions are made only of such a width as will permit the bail to swing freely forward and backward. The bail E is cast of malleable metal, so that, after being slipped through the loop $d$ of the tongue-piece D, and passing the ends of the side bars $e^2$ of the bail through the openings $g$ $g$, the said ends can be sprung apart, so as to cause the pivots of the bail to engage under the side bars of the buckle-frame. In this manner a permanent connection of the bail and tongue-piece with the buckle-frame is obtained in a simple and effective manner.

Having thus fully described my invention, what I claim as new, and desire to secure by Letters Patent, is—

In a trace-buckle, the combination, with the tongue-plate D and bail E, of the buckle-frame C, having each of its side bars provided with two or more pivot-bearings or recesses, $e$ $e^1$, of different depths, to adapt the buckle to hold traces of different thicknesses, substantially as hereinbefore set forth.

EMMIT G. LATTA.

Witnesses:
ASA SCOTT,
S. S. LATTA.